Jan. 22, 1924. 1,481,486
G. D. SUNDSTRAND
FEED BOX
Original Filed Oct. 2, 1919   4 Sheets-Sheet 1
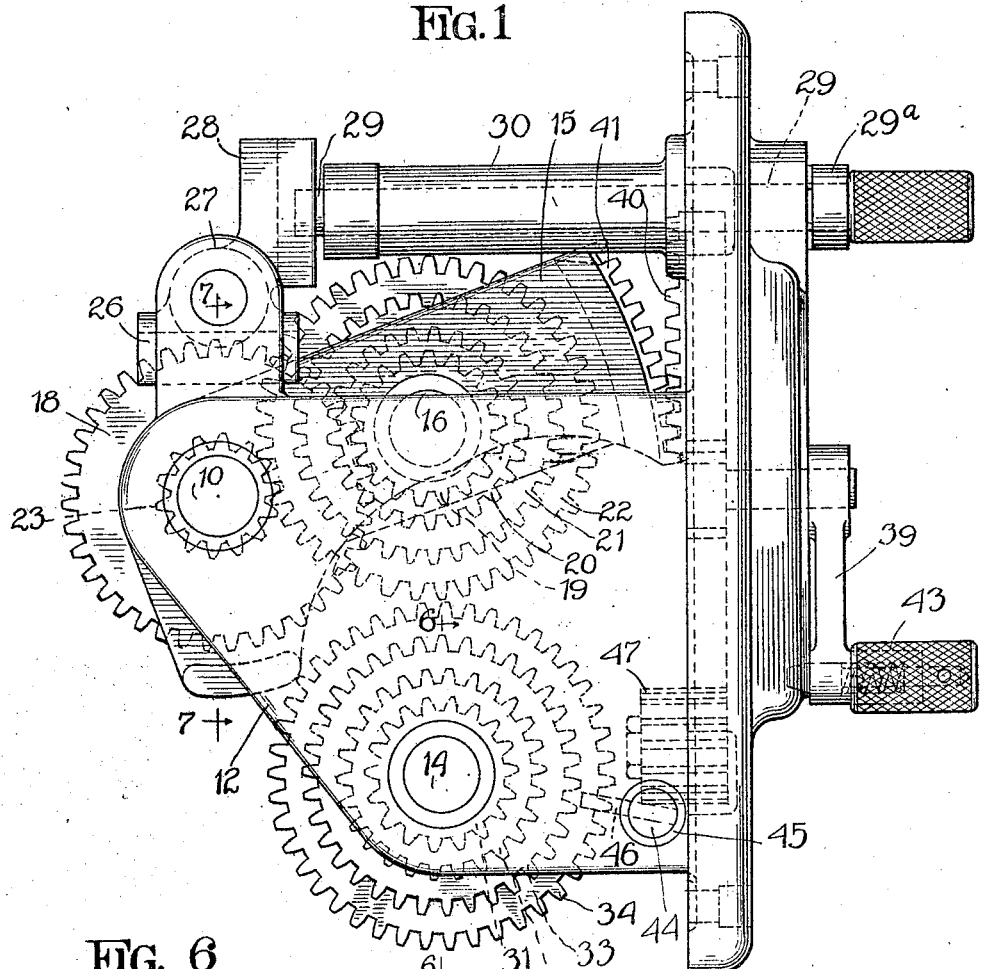
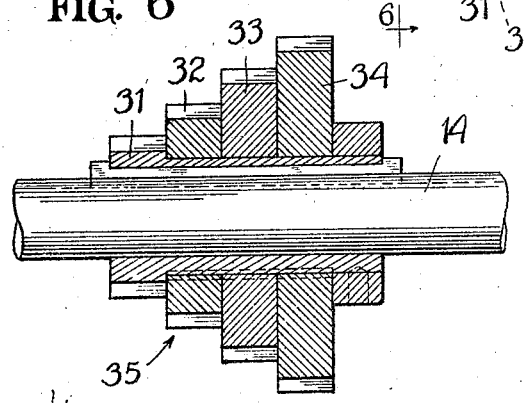
Inventor
Gustaf D. Sundstrand

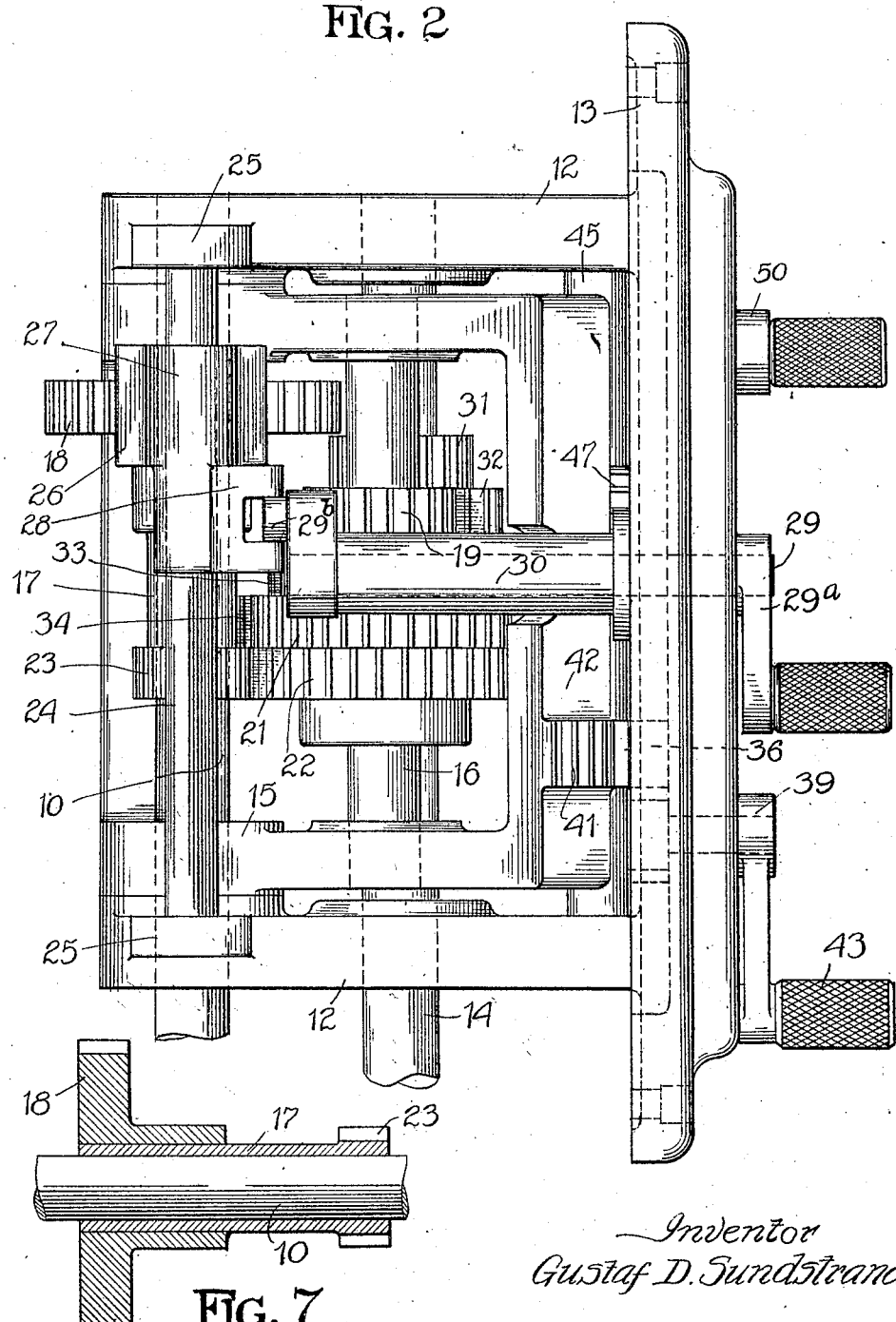

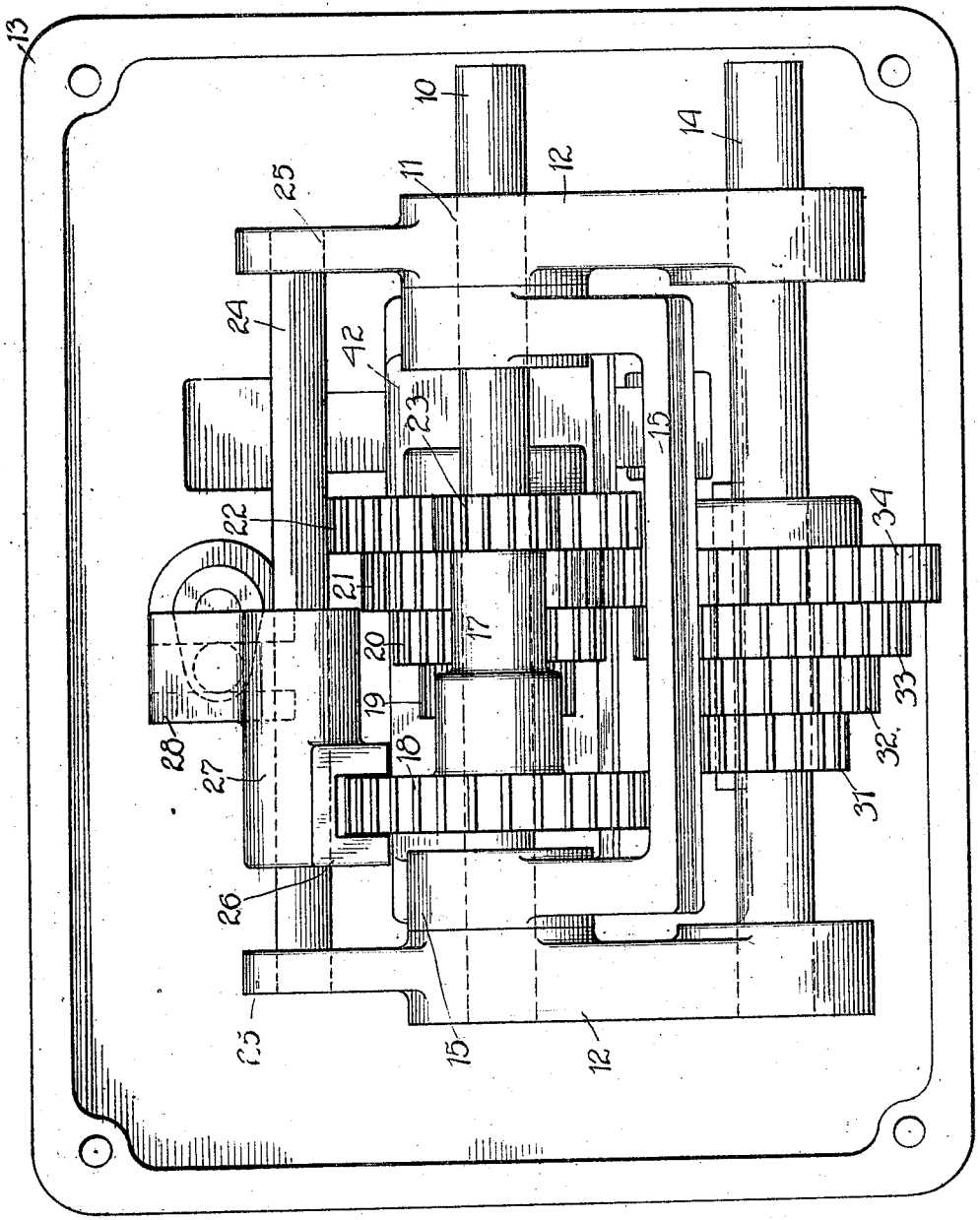

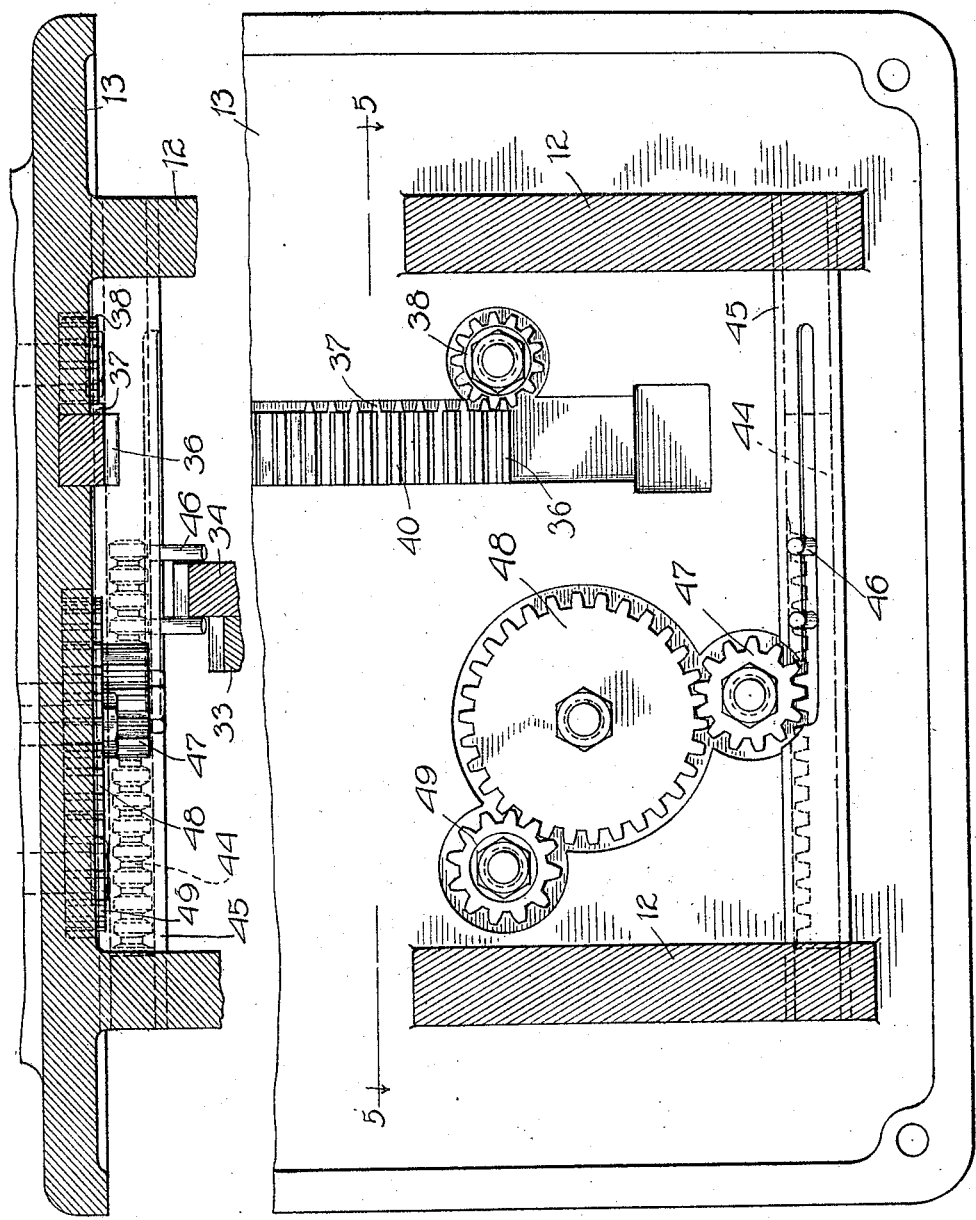

Patented Jan. 22, 1924.

1,481,486

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

FEED BOX.

Application filed October 2, 1919, Serial No. 328,058. Renewed June 22, 1923.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Feed Boxes, of which the following is a specification.

My invention relates to feed boxes or devices for the transmission of power adjustably to operate at a large number of speed ratios and especially suitable for use in operating the feed mechanisms of power driven machine tools.

An object of my invention is to provide a compact and rigid construction for devices of the class referred to, relatively simple and comprising a small number of parts, cheap to manufacture, easy to assemble and durable in service.

A special object is to eliminate the long shafts of small diameter necessarily used in prior constructions, which shafts have so little rigidity that they spring more or less out of alinement resulting in noisy operation and excessive wear on the gear teeth.

In the accompanying drawings, Figure 1 is an end view of a feed box according to my invention. Fig. 2 is a top plan view of the same device, and Fig. 3 an elevation looking from the left in Fig. 1 with the gears in mesh to transmit power. Fig. 4 is a fragmentary view of the front plate and associated parts showing the transmission from the handles on the front of the machine. Fig. 5 is a section on the line 5—5 of Fig. 4. Fig. 6 is a longitudinal section showing the sliding mounting of the lower gears. Fig. 7 is a partial section on the line 7—7 of Fig. 1.

In the embodiment of my invention selected for illustration, power is delivered to a shaft 10 journaled in bearings 11 in spaced flanges 12 projecting from the front plate 13, and is transmitted through suitable change gears to a shaft 14. Referring to Figs. 1 and 2, a bracket 15 journaled on the shaft 10 carries an intermediate shaft 16 having a series of gears of different sizes, four, in this instance. A sleeve 17 splined on the shaft 10 carries a large gear 18 adapted to mesh with the smallest gear 19 of the four gears 19, 20, 21 and 22 on the intermediate shaft 16, and a small gear 23 adapted to mesh with the largest gear 22. The gears on the intermediate shaft 16 do not slide but merely rotate on the shaft and rock with the shaft 16 around the shaft 10. In Figs. 2 and 3, the sleeve 17 is illustrated with the small gear 23 meshing with the large intermediate gear 22.

A stationary guide shaft 24 mounted in upstanding lugs 25 projecting from the webs 12 carries a gear shifting device comprising spaced fingers 26 adapted to straddle the large gear 18, a cylindrical bearing portion 27 splined on the shaft 24, and an upwardly extending slotted standard 28. A manual control shaft 29 suitably journaled in a sleeve 30 projecting from the front plate 13 carries a small crank arm at its inner end having a projection 29$^b$ engaging the vertical slot in the standard 28. It will be seen that rotation of the control shaft through 180 degrees will slide the sleeve 17 from the position shown in Figs. 2 and 3 to a position with the large gear 18 in mesh with the small intermediate gear 19.

A suitable handle 29$^a$ having the usual spring pressed locking pin may be used to control the shaft 29. The shaft 14 carries a series of gears 31, 32, 33 and 34, corresponding to the intermediate series of gears. As illustrated in Fig. 6, these last mentioned gears, indicated as a whole by the reference character 35 are slidably but nonrotatably mounted with respect to the shaft 14 and may be shifted longitudinally with respect to the intermediate gears into seven different positions for obtaining seven different relative speeds for shafts 16 and 14. In Fig. 3, I have illustrated the large gear 34 in mesh with the second largest intermediate gear 21. It will be apparent that upon raising the intermediate gears the lower set of gears 35 may be shifted to bring its large gear 34 into the plane of any one of the intermediate gears or to bring any one of its own gears into the plane of the large intermediate gear 22.

I have illustrated suitable means for lifting the intermediate shaft 16 and its associated gears up to allow lower gears 35 to be slid into any desired longitudinal position. As illustrated this means comprises a vertically slidable member 36 (see Figs. 1 and 4) having rack teeth 37 along one side adapted to mesh with a small pinion 38 manually operated by means of any suitable handle such as the crank 39, and having along its face a second rack 40 meshing with gear teeth 41 formed on the adjacent cross web 42 of the bracket 15. One or more properly arranged or spaced holes in the face of the front plate 13 and a suitable spring pressed holding device 43 may be provided for holding the bracket 15 in each one of the different positions necessary to bring the different sets of intermeshing gears into proper spaced relationship.

Suitable means are provided for sliding the lower gears 35 longitudinally along the shaft 14. I have illustrated a rack 44 slidably mounted in a slotted tube 45 and having projecting fingers 46 adapted to straddle the large gear 34. The rack may be shifted along the tube by a pinion 47 suitably driven by a gear 48 engaging another pinion 49 actuated by a crank 50 similar to the crank 39 above described. The pinion 49 and the gear 48 are both set in recesses in the inner face of the front plate 13 and the pinion 47 is of greater axial dimensions than the pinion 49 and gear 48, projecting as shown in Fig. 1 to suitably engage the rack teeth on the rack 44.

In the devices of the prior art, the gears on the shaft 14 were stationary and the intermediate gears on the shaft 16, the entire bracket 15 and sleeve 17 were all slidable as a unit longitudinally along shaft 10. To secure proper speed ratios it is necessary that the gear 23 on the sleeve 17 should be small which necessarily limits the diameter of the shaft 10. Shaft 10 being small in diameter and long enough to allow shifting of the intermediate gears through at least nine times the length of the face of a single gear to allow for seven positions of the intermediate gears with respect to the lower gears and one shift of the sleeve with respect to the intermediate gears, was very long and very slender and did not possess sufficient rigidity for satisfactory service. It will be seen that I have eliminated this defect by eliminating the excessive length of shaft 10. It is obvious that power may be transmitted through the mechanism disclosed in either direction with equal efficiency.

While I have shown and described in detail the embodiment of my invention at present preferred, it should be clearly understood that the disclosure is only for purposes of illustration and that many variations and modifications will naturally occur to those skilled in the art. I aim in the subjoined claims to cover all such legitimate modifications and variations.

I claim as my invention:

1. In a mechanism of the class described, a power receiving shaft, a power delivering shaft and an intermediate shaft, a plurality of gears on each of said shafts, the gears on said power receiving and power delivering shafts being longitudinally slidable to vary the speed ratios of said shafts, and the intermediate shaft being movable to carry its gears into and out of mesh with the gears on one of the other shafts.

2. In a mechanism of the class described, three parallel shafts triangularly spaced, gears on each of said shafts, means for rocking one of said shafts about a second shaft as a center, the gears carried by said rockable shaft being adapted upon its rotation about said second mentioned shaft to be moved into and out of engagement with the gears on said third shaft, and means for sliding the gears on said second and third shafts longitudinally to vary the speeds of said shafts with respect to said intermediate shaft.

3. In a mechanism of the class described, three parallel shafts triangularly spaced, means for rotating one of said shafts around a second shaft as a center to move it toward and away from the third shaft, a plurality of gears on said rockable shaft, a pair of gears on said second shaft, means for sliding said last mentioned gears longitudinally to bring either one into mesh with a gear on said rockable shaft, a plurality of gears on said third shaft, and means for sliding the gears on said third shaft to vary the relative speeds of said first and third shafts.

4. In a device of the class described, three triangularly spaced parallel shafts, means for rocking one of said shafts around a second shaft to move it toward and away from the third shaft, a series of gears successively decreasing in size on said rockable shaft, said gears being constrained to rotate as a unit, a large and a small gear mounted to rotate together and slide longitudinally on said second shaft, means for sliding said last mentioned gears to bring said large gear in mesh with the smallest intermediate gear or said small gear in mesh with the largest intermediate gear, a series of gears on said third mentioned shaft mounted to rotate together and to slide longitudinally, and means for sliding said last mentioned gears to bring the largest one thereof in mesh with any intermediate gear or to bring any one thereof in mesh with the largest intermediate gear.

5. In a mechanism of the class described, three triangularly spaced parallel shafts comprising a power shaft, an intermediate shaft rockable around said power shaft as a center and a delivery shaft, a plurality of gears on each of said shafts, means for sliding the gears on said power shaft longitudinally to obtain two speed ratios between said power shaft and said intermediate shaft, and means for sliding gears on said delivery shaft to obtain a plurality of speed ratios between said intermediate shaft and said delivery shaft.

6. A mechanism of the class described having a power shaft, a delivery shaft, and an intermediate shaft, said intermediate shaft being rockable about said power shaft as a center to move it toward and away from said delivery shaft, a series of gears successively decreasing in size mounted to rotate as a unit on said intermediate shaft, a large and a small gear mounted to rotate as a unit and to slide longitudinally on said power shaft, means for shifting the gears on said power shaft to bring said small gear in mesh with the largest gear on said intermediate shaft or said large gear in mesh with the smallest gear on said intermediate shaft, a series of gears successively decreasing in size mounted to rotate as a unit and to slide longitudinally on said delivery shaft, the number of gears in said last-mentioned series being the same as the number of gears on said intermediate shaft, and means for sliding said delivery shaft gears to bring the largest delivery shaft gear in mesh with any intermediate gear or to bring the largest intermediate gear in mesh with any delivery gear whereby speed ratios one less in number than twice the number of delivery gears may be obtained between said intermediate shaft and said delivery shaft.

7. A mechanism of the class described, having in combination, a power shaft, a delivery shaft, and an intermediate shaft rockably mounted about said power shaft as a center to move toward and away from said delivery shaft, means for driving said intermediate shaft from said power shaft, and means for driving said delivery shaft from said intermediate shaft at a plurality of different speeds, said means comprising a plurality of gears of different sizes on said delivery shaft, and means for sliding said gears along said delivery shaft to bring different gears into operative position for the transmission of power.

8. In a mechanism of the class described, a fixed shaft and a movable shaft, means for moving said movable shaft toward and away from said fixed shaft, a series of gears successively decreasing in size on each of said shafts, and means for sliding the gears on said fixed shaft to vary the relative positions of said sets of gears whereby said shafts may be driven at various speed ratios.

9. In a mechanism of the class described, a front plate, vertical brackets extending rearwardly from said front plate, two relatively fixed shafts journaled in said brackets, a carrying frame rotatable but not slidable on one of said shafts, an intermediate shaft journaled in said carrier frame, a plurality of gears of various sizes on each of said intermediate and fixed shafts, the smallest gear on one of said fixed shafts being smaller than the smallest gear on the other fixed shaft, means for longitudinally shifting the gears on said first-mentioned fixed shaft to secure one change of speed, and means for shifting the gears on said other fixed shaft to secure a plurality of speed changes.

10. A mechanism of the class described having a front plate, brackets projecting inwardly from said front plate, a pair of relatively fixed shafts journaled in said brackets, a carrier frame journaled on one of said fixed shafts, an intermediate shaft carried by said carrier frame, a plurality of gears of various sizes on each of said shafts, means for shifting gears on each of said fixed shafts to vary the speed ratio between each fixed shaft and the intermediate shaft, means for rotating said carrier frame to move the gears on said intermediate shaft into and out of positions operative for the transmission of power between said fixed shafts, and independent manual control means mounted on said front plate for shifting the gears on each fixed shaft and for rotating said carrier frame.

11. In a mechanism of the class described, a front plate, rearwardly projecting brackets on said front plate, a relatively fixed power shaft journaled in the rear portion of said brackets, a rotatable but non-slidable carrier frame journaled on said power shaft, an intermediate shaft journaled in said carrier frame, gears on said intermediate shaft and longitudinally slidable gears on said power shaft adapted to be shifted to vary the speed ratios between said power shaft and said intermediate shaft, and means for shifting said gears comprising a guide shaft extending parallel to said power shaft, a pair of control fingers slidably mounted on said guide shaft and adapted to straddle one of the gears on said power shaft, a rotatable control shaft extending rearwardly from said front plate and operatively connected with said guide fingers and manual control means located in front of said front plate for operating said control shaft.

12. In a mechanism of the class described, a front plate, rearwardly projecting brackets on said front plate, two relatively fixed shafts journaled in said brackets, an intermediate shaft rockable about one of said shafts as a center to move toward and away from the other shaft, gears on said last mentioned shaft, and gears on said rockable shaft, said first-mentioned gears being slidable to selectively vary the speed ratios between said shafts, and means for sliding said gears comprising, in combination, a member extending parallel to said last-mentioned fixed member and spaced therefrom, a member slidable in said fixed member and having projections adapted to engage the gears on said fixed shaft, a manual control means in front of said front plate, and an operative transmission from said manual control means to said slidable member.

13. In a mechanism of the class described, the combination of a pair of fixed shafts and an intermediate shaft, each of said shafts having a plurality of gears thereon, the gears of said intermediate shaft being fixed against axial movement and movable into and out of operative engagement with the gears on one of said pair of shafts while continuing to mesh with certain of the gears on the other one of said pair of shafts.

14. In a mechanism of the class described, the combination of an upright member, a pair of spaced bracket members carried by said upright member, a pair of shafts journalled in said bracket members and each having a plurality of gears thereon, a carrier mounted for pivotal movement only with respect to said bracket members and having a plurality of gears journalled therein, means for moving the gears on said pair of shafts axially, and means for swinging said carrier to move its gears in vertical planes.

15. In a mechanism of the class described, the combination of a power shaft, a driven shaft and an intermediate shaft each having a plurality of gears thereon, the gears upon said power and driven shaft being movable axially and the gears upon the intermediate shaft vertically, and means for shifting said axially movable gears and swinging said vertically movable gears including a crank for each of said shafts, the crank for the intermediate shaft being located between the cranks for the power and driven shafts.

16. In a mechanism of the class described, the combination of a pair of shafts each having a plurality of gears slidably but non-rotatably mounted thereon, and a third shaft also having a plurality of gears thereon fixed against longitudinal movement, said third shaft being rockable to carry its gears into and out of mesh with the gears on one of said pair of shafts.

17. In a variable speed gearing, the combination of three shafts, two of which have a corresponding number of gears and are relatively movable toward and from each other while the gears on one only of said two shafts are shiftable axially, and the third shaft having two gears adapted to mesh with the larger and smaller gears, respectively, on one of the other two shafts.

18. In a variable speed gearing, the combination of a fixed shaft, a second shaft movable toward and away from the fixed shaft, the movable shaft having a series of fixed gears successively decreasing in size, and the fixed shaft having a pair of slidable gears adapted to mesh respectively with the larger and smaller gears only of said series, and a third fixed shaft having a plurality of slidable gears similar to the series of gears on the movable shaft.

19. In a variable speed gearing, the combination of a pair of shafts each having a series of contiguous gears successively decreasing in size, the gears on one shaft being shiftable axially and the gears on the other being fixed but movable bodily with their shaft, and a third shaft having gears spaced a substantial distance apart and movable axially for interengagement with certain of the fixed gears.

In testimony whereof, I have hereunto set my hand.

GUSTAF DAVID SUNDSTRAND.